May 7, 1940.                F. R. HOUSE                 2,199,404
                      SOUND LOCATOR APPARATUS
                       Filed Oct. 13, 1937          3 Sheets-Sheet 1
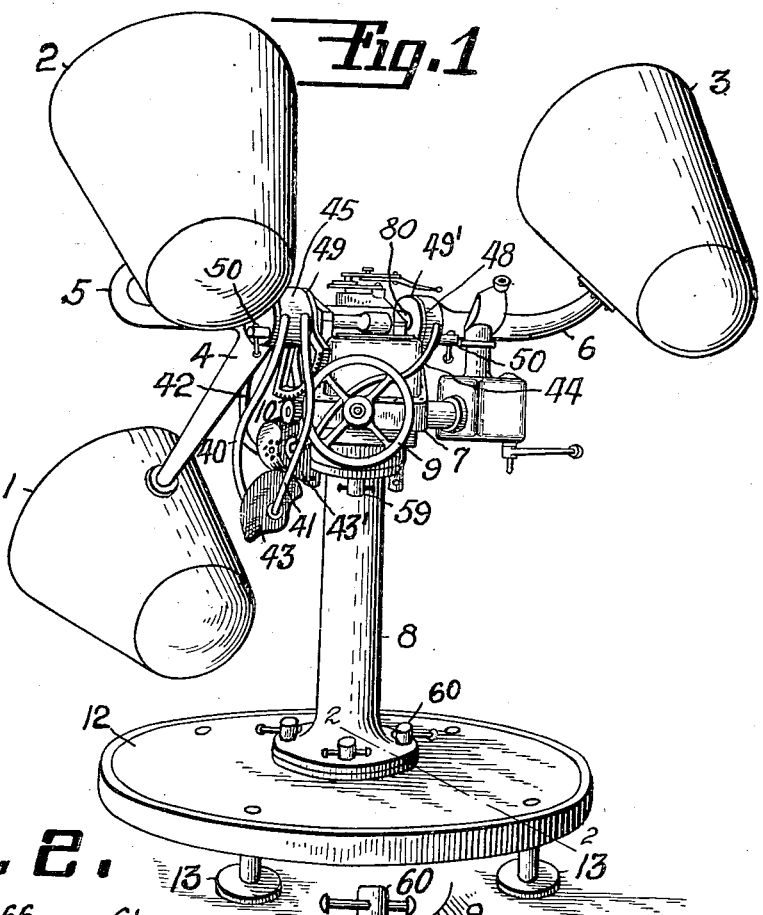
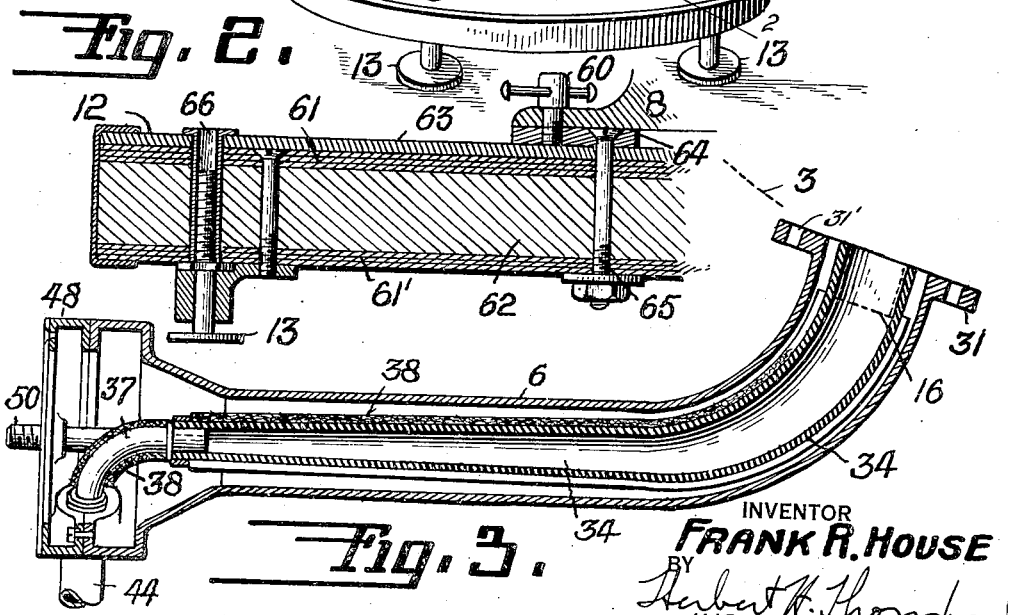
INVENTOR
FRANK R. HOUSE
BY
HIS ATTORNEY May 7, 1940.  F. R. HOUSE  2,199,404
SOUND LOCATOR APPARATUS
Filed Oct. 13, 1937  3 Sheets-Sheet 2
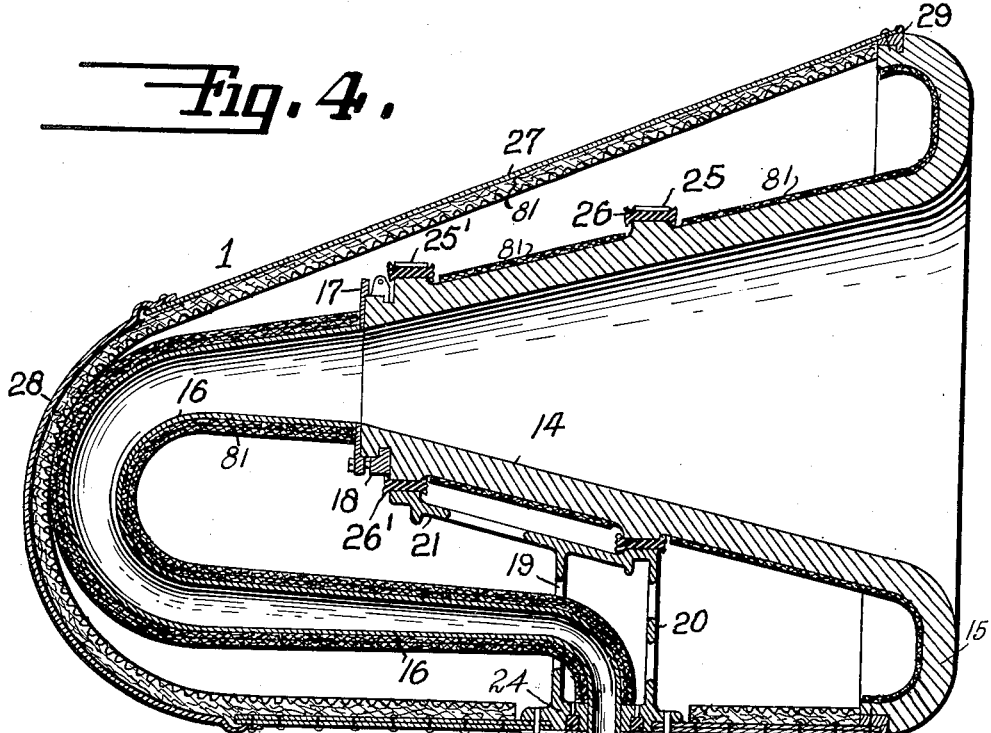
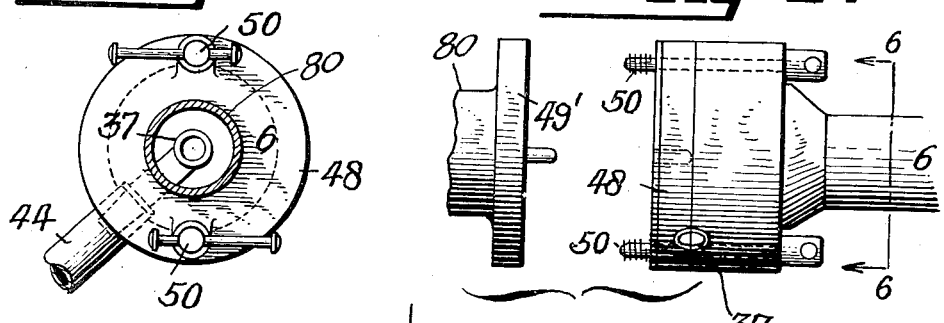
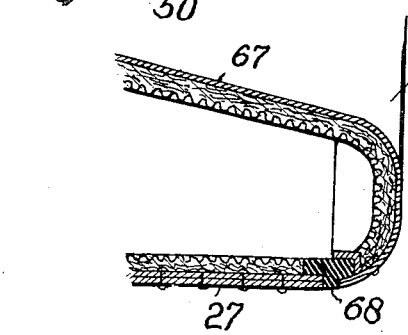
INVENTOR
FRANK R. HOUSE
BY
Herbert H. Thompson
HIS ATTORNEY

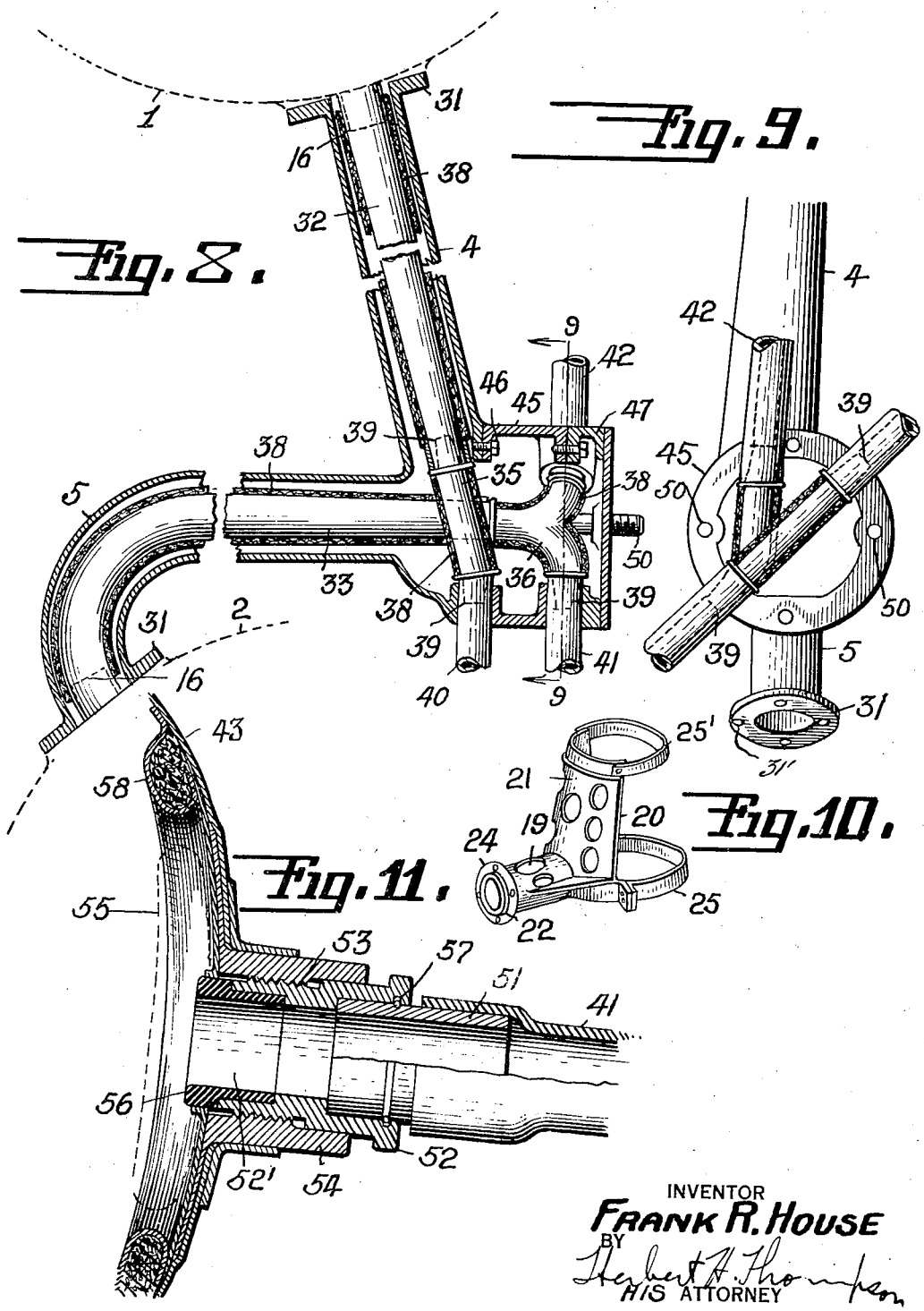

Patented May 7, 1940

2,199,404

UNITED STATES PATENT OFFICE 2,199,404

SOUND LOCATOR APPARATUS

Frank R. House, Baldwin Harbor, N. Y., assignor to Sperry Gyroscope Company, Inc., Brooklyn, N. Y., a corporation of New York Application October 13, 1937, Serial No. 168,794

9 Claims. (Cl. 181—26)

This invention relates, generally, to apparatus for locating aircraft or other moving targets under conditions of poor visibility, as at night or during fog, and the invention has reference, more particularly, to improvements in sound locator receivers and associated apparatus of the type disclosed in my copending application now Patent 2,159,481, dated May 23, 1939.

Inasmuch as sound location is always conducted in an ambient of audible noise, the sound of an aircraft or other object to be located cannot be made audible until its total sound level at the listening station or some part of its sound spectrum reaches a level approximating that of the ambient. A reduction in ambient sound results in increased listening range, and hence sound-proofing of sound locator receivers to reduce ambient sound in the receiver is important. Ambient sound may be divided into two classes, i. e., general background and local noises, the first consisting of sound that is generated at a distance from the receiver and is air borne to the latter, and the second consisting of sound generated within the receiver assembly and transmitted directly by vibration to the receiver sound track.

The principal object of the present invention is to provide novel improvements in the sound insulation and vibration damping of sound location receivers of the type disclosed in my above mentioned application, whereby ambient background sound reaching the outside surfaces of the receiver are effectively insulated against transmission to the receiver sound track, and ambient local sound is also prevented from transmission to the sound track due to thorough local vibration insulation of the receiver sound track.

Another object of the present invention lies in the provision of novel sound locator apparatus having listening helmets provided with ear pieces especially designed to fit around the user's ears without applying pressure directly thereto, and adapted to be readily centered with respect to the ears, the same having adjustable sound track end pieces for cooperating with the ear concha for preventing extraneous noises and vibration from reaching and distorting the sound traveling in the sound track and received through the sound receiver opening, the said helmets being adapted to be readily and quickly attached to or detached from the sound receivers in use.

Still another object of the present invention is to provide a novel sound locator apparatus having receivers so constructed and arranged that the same may be readily disassembled from their supporting pedestal for transport without disconnecting or breaking their sound tracks at any point, thereby enabling the ready reassembly of the receivers to their pedestal, when desired, without in any way interfering with the acoustical properties of the receivers.

A further object of the present invention lies in the provision of a novel sound locator apparatus of the above character employing receivers or horns, each of which has the forward portion of its sound track of conical shape, thereby obtaining the advantage of low frictional loss adjacent the receiver opening, whereas the rear portion of such sound track is of exponential shape, thereby also obtaining the advantages of the fidelity of amplification or response over a wide frequency range characteristic of the exponential horn.

Other objects and advantages will become apparent from the specification, taken in connection with the accompanying drawings wherein the invention is embodied in concrete form.

Fig. 1 is a view in elevation of the novel improved sound locator apparatus of this invention.

Fig. 2 is a fragmentary sectional view of the apparatus platform taken approximately on line 2—2 of Fig. 1.

Fig. 3 is a sectional view of an azimuth receiver supporting arm for horn 3 of Fig. 1.

Fig. 4 is a central longitudinal sectional view of a receiver.

Fig. 5 is a fragmentary view illustrating the manner of detachably connecting a receiver arm to the pedestal head.

Fig. 6 is a sectional view taken along 6—6 of Fig. 5.

Fig. 7 is a fragmentary sectional view of a slightly modified form of receiver.

Fig. 8 is a sectional view of the connected supporting arms of an elevation receiver and the common azimuth and elevation receiver.

Fig. 9 is a view taken substantially along line 9—9 of Fig. 8.

Fig. 10 is a perspective view of the horn supporting bracket.

Fig. 11 is a fragmentary sectional view of a portion of the listening helmet in the region of the user's ear.

Similar characters of reference are used in all of the above figures to indicate corresponding parts.

Referring now to the said drawings, the sound locator apparatus comprises a suitable arrangement of listening or sound collecting receivers or horns 1, 2 and 3 mounted for both turning in azimuth and tilting in elevation, the horn 2 being a common horn in that it cooperates with horn 1 in making elevation determinations and with horn 3 in making azimuth determinations. The horns or receivers 1, 2, 3 are carried by arms 4, 5, 6 that are detachably secured to a common cross shaft 60 which is, in turn, mounted for turning in elevation on a head 7 by means of an elevation handwheel 9 connected through gearing 10 for turning the horns 1, 2, 3. Head 7 contains the sound lag correction and other apparatus forming no part of the present invention, and is mounted for turning in azimuth on a pedestal 8 by means of an azimuth handwheel (not shown). Pedestal 8 is mounted upon a circular platform 12 that is supported in a level position by adjustable leveling screws 13.

The horns or receivers 1, 2, 3 are smaller than the usual exponential horn and are carefully streamlined and soundproofed to avoid transmitting extraneous or ambient sounds through the receiver casing to the horn sound track, which extraneous sounds would render use of the apparatus more difficult while decreasing the sensitivity and accuracy of the same. Each receiver is constructed with a sound track having the forward portion thereof of conical shape defined by a conical shaped interior wall 14 preferably made of wood and having a rolled or bell mouth 15, which merges into the outer conical casing or covering 27, hereinafter described, forming a smooth, streamlined exterior. This conical forward portion of the sound track possesses the advantage of low air frictional loss, whereby it is possible to make the overall dimensions of the horn, including the horn mouth, much less than would be necessary were a pure exponential horn used for obtaining the same amplification.

The remainder of the sound track of the horn is of exponential shape, thereby obtaining the fidelity of response over a wide frequency range, characteristic of the exponential horn. This exponential portion of the horn comprises the goose neck portion 16 having its forward and upper end forming a continuation of conical portion 14 and its reduced lower end projecting into an exponential tube extending within the tube arm and also constituting a portion of the sound track. The part of the goose neck 16 adjoining the cone 14 may be of hybrid shape to facilitate the flaring or merging of the exponential portion of the horn into the conical portion thereof. The goose neck 16 is preferably made of metal, the forward and upper end of which is provided with a flange 17 that is secured as by screws to a split ring 18 fixed upon the rear portion of the conical wall 14. The rear of the goose neck portion 16 curves downwardly and then this portion extends forwardly into underlying relation to the conical horn portion 14 and through an opening 19 in the tubular shank 20 of a bracket 21. At the bottom of shank 20 is a fixed collar 24 which has an annular channel 22 embracing an annular rubber ring 23.

The bracket 21 (see Figs. 4 and 10) is shaped to conform to the conical horn portion 14 and has straps or bands 25, 25' attached thereto for extending around conical portion 14 for securing and supporting this horn portion upon bracket 21. Resilient bands 26, 26', as of rubber, are interposed between horn portion 14 and straps 25, 25' in order to absorb and prevent the sound vibrations and shocks from being transmitted from bracket 21 to the interior of the horn, or, in other words, into the sound track or conduit.

The horn is provided with an outer substantially conical casing or cover 27, preferably of sheet metal, that is attached at its forward end to a split ring 29 fixed upon the outer edge portion of the bell or rounded mouth 15, the rear portion of casing 27 being rounded at 28. The inner surface of the casing 27 and the outer surface of the horn proper are covered with suitable fibrous sound absorbing material 81 such as corrugated "Seapack" or other material, as glass wool.

Each of the sound receivers 1, 2, 3 is attached to its respective arm 4, 5, 6 as by set screws extending through apertures 31' in a flange 31 on one end of the arm, said screws being threaded into a collar 24 on the shank 20 of horn bracket 21. Arms 4, 5 and 6 have exponential tubes 32, 33 and 34, respectively, therein that are continuations of the sound tracks of the horns, these tubes having their larger ends attached to the ends of goose necks 16 and their smaller ends attached to fittings 35, 36 and 37. Tubes 32, 33 and 34 are preferably of rubber reenforced by exterior spiral metal bands, and these tubes together with fittings 35, 36, 37 are covered with sound insulation material 38. These fittings have nipples 39 at their ends for engaging in the exponential tubes and in flexible tubes leading to the listening helmets. Thus, fitting 35 is connected to the tube 40 extending to the listening helmet 43 of the elevation operator. Fitting 36 has two outlets, one of which is connected to the tube 41, also leading to the listening helmet 43 of the elevation operator, whereas the other outlet is connected to a tube 42 leading to the listening helmet 43' of the azimuth operator. The fitting 37 (Fig. 6) is connected to tube 44 extending to the listening helmet 43' of the azimuth operator.

Tubes 40, 41, 42 and 44 are preferably of rubber and are clamped upon the nipples 39 of the various fittings by the novel arm base or casing construction illustrated in Fig. 8, in which it will be noted that the arms 4 and 5 are interconnected and are attached at their junction by screws 46 to an open-ended cylindrical base member 45, the plane of the inner end of which is aligned with the center line of tube 40 so that by tightening the attaching screws 46, the ends of the tube arms and the base member 45 are clamped upon the tube 40 by pressing this tube firmly against the nipple 39. Similarly, tubes 41 and 42 are secured between member 45 and an adjoining cylindrical base cover member 47, thereby securing these tubes to the respective nipples of fitting 36. Similarly, tube 44, connected to fitting 37 in arm 6, is bound upon this fitting by a cylindrical arm base member 48 screwed upon the end of the arm 6. The interconnected arms 4 and 5 are removably attached to a flange support 49 provided on the cross shaft 60, and the arm 6 is similarly attached to a flange support 49' on this shaft by means of screws 50 extending through apertures in the cylindrical members 45 and 48 and threaded into apertures in the flanges 49, 49'.

The flexible rubber tubes leading to the helmets are adapted to be readily detached from the latter so that the operators may wear their helmets when on duty and need merely plug the tubes into their helmets when desiring to use the apparatus. Fig. 11 illustrates a typical construction of the listening helmets, wherein tube 41 is shown provided with a nipple plug 51 at its end that is adapted to be plugged into a cylindrical conduit member 52 provided in the helmet ear piece. This conduit member is shown as provided with an external thread at 53 threaded into a hollow boss 54 provided on the ear piece of the helmet 43, opposite the listener's ear 55. The inner portion of the conduit member 52 is shown provided with a non-metallic inner end member 56 that is adapted to enter into the ear concha. The conduit member 52 has a spring ring 57 which by engaging into a conforming annular groove in plug 51, serves to yieldingly retain this plug in the tube 52. The inner surface of the helmet is shown provided with a ring-like boss or pad 58 of padding material adapted to extend around the listener's ear 55 so as to relieve the ear of pressure, while at the same time, engaging the head all around the ear, serving to prevent extraneous noises from reaching the ear.

In using the helmet, the operator places the same upon his head with the tubes, such as tube 41, disconnected and inserts his forefingers into the central apertures 52' of the helmet ear piece conduit member and shifts these tubes 52, and hence the ear pieces of the helmet, if necessary, so as to align the tubes 52 with the ear conchas. He thereupon turns the conduits or tubes 52 so as to thread these tubes inwardly or outwardly to bring the ear pieces 56 into comfortable position within the ear conchas. When he desires to listen in at the apparatus, it is merely necessary to plug the nipple plugs 51 of the tubes 40, 41 or 42, 44, as the case may be, into the helmet ear piece sockets, and is assured of proper hearing inasmuch as these tubes are aligned directly with the centers of the listener's ears, the projection of members 56 into the ear conchas serving to eliminate echo effects. The helmets, however, are not claimed per se in this application but are claimed in my divisional or continuation application, Serial No. 287,236, filed July 29, 1939, for Listening helmets for sound locators.

Not only are the tube arms readily detachable from the head 7, but this head 7 is also readily detachable by means of screws 59 from the pedestal 8, and this pedestal is also detachable by means of screws 60 from the platform 12. This platform is made sound absorbent in order to prevent local noises due to walking thereon from being transmitted to the horns, and consists essentially, as shown in Fig. 2, of upper and lower multi-ply boards 61 and 61' that are attached to the upper and lower surfaces of an intermediate board 62, of balsa wood, which has excellent sound and vibration absorbing qualities. Linoleum 63 is shown covering the upper surface of the ply board 61. A ring 64 is attached to the upper surface of platform 12, as by screws 65, to which ring the pedestal 8 is attached by screws 66. Leveling screws 13 are threaded into vertical tubes 66 and are adjustable as to height by inserting screw drivers into these tubes.

If desired, instead of making the conical forward portion 14 of the sound receivers of wood, such as balsa wood, the same may be made of sheet metal, as indicated at 67 in Fig. 7, in which case this forward conical portion of the horn is connected to the outer casing 27 by an intermediate resilient ring 68, as of rubber, whereby the horn is floated within its outer casing, which, in effect, is true of the form of the invention shown in Fig. 4, wherein the yieldable nature of the wood horn 14 provides a yieldable support for the horn.

Inasmuch as the sound receivers are streamlined and have all corners rounded, they tend to greatly reduce local noise due to winds blowing past them. Also, since the entire sound track is enclosed either within the casing 27 or within arms 4, 5 and 6, winds cannot directly contact the walls of the sound track to create noise for transmission into the interior thereof. Further, since the entire sound track is resiliently enshrined and supported by rubber, there being no direct metal to metal contact between any part of the sound track and the casing 27 or receiver arms 4, 5 and 6, local vibration and noises such as those due to gearing are absorbed and do not reach the sound track. Since the entire sound track as well as the casing 27 is sound-proofed with sound absorbing material, ambient sound from whatever source is excluded, except that which enters the mouths of the receivers for amplification and transmission to the ears of the listeners. In using the receivers of this invention, it is found that the ear is better able to distinguish aircraft noise from the ambient noise due to the combined conical and exponential structure of the sound tracks, such compound structure acting to amplify the range of aircraft noises to a greater extent than the low frequency ambient sounds.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In sound locator apparatus, a sound receiver having a compound sound conduit member consisting of a forward portion of conical shape and a rear portion of exponential shape, insulating means completely enclosing said sound conduit member with the exception of its forward open end, and a resilient mounting interposed between said conduit member and said enclosing means, whereby sound vibrations of the apparatus are prevented from being transmitted to the conduit member.

2. In a sound locator apparatus, a plurality of sound receivers, hollow arms for supporting said sound receivers, said sound receivers having casings and sound conduit members extending within the receiver casings and within their supporting arms, tubes connected to the ends of said sound conduit members and extending outwardly through said arms for connection to listeners' helmets, and means for supporting said arms for rotation together in azimuth and elevation, and means whereby said receivers and their arms may be disconnected from said supporting means without severing said sound conduit members or said tubes.

3. In a sound locator apparatus, a supporting pedestal, a sound absorbing platform for said pedestal comprising upper and lower layers of ply-boards and an intermediate layer of sound absorbent board.

4. In a sound locator apparatus, a sound absorbing platform comprising upper and lower layers of ply-boards and an intermediate layer of sound absorbent board, a pedestal disconnectably mounted on said platform and having a disconnectable head, and sound receivers having supporting arms disconnectably mounted on said head.

5. In an apparatus of the character described, a sound receiver having a streamlined outer casing, a supporting bracket within said casing, a horn mounted within said bracket within said casing, sound absorbent material between said horn and bracket, said horn having a rounded mouth merging into said casing forward portion, a goose neck portion at the inner end of said horn extending within said casing and outwardly thereof through said bracket, and a resilient mounting between said goose neck portion and said bracket to absorb shocks and sound vibrations.

6. In an apparatus of the character described, a sound receiver having a streamlined outer casing, a horn within said casing having a rounded mouth portion and a goose neck rear portion, resilient supports for said horn within said casing so that at no point is there metal to metal contact between said horn and its casing, whereby said horn is free to vibrate within its casing, and insulating or sound absorbing material on the exterior of said horn and the interior of said casing.

7. In sound locator apparatus, a sound receiver having a compound sound conduit consisting of a forward conical wooden portion extending rearwardly for the greater portion of the external dimension of the horn and a rear metallic portion of exponential interior shape communicating with the rear of said conical portion and reversely curved, and insulating means completely enclosing both portions of said conduit except for the forward rounded end thereof.

8. A sound locator comprising a pedestal, a head rotatably mounted in azimuth thereon, a horizontal cross shaft journalled therein for rotation in elevation, hollow arms detachably secured to each end of said shaft, a single horn on one arm lying above or below the horizontal axis of said shaft, a pair of horns spaced in elevation from each other and secured to said other arm, one of said pair lying in the same horizontal plane as said first horn, the sound conduits leading from each horn terminating in said arms adjacent their juncture with said cross shaft, and sound listening helmets connected with the termini of the conduits, whereby the two listening structures may be removed from the pedestal without breaking the sound paths.

9. In an apparatus of the character described, a sound receiver having a streamlined outer casing, a supporting bracket within said casing, a horn having a rounded mouth merging into the forward portion of said casing, said horn being supported by said bracket within said casing, and sound absorbent material between said bracket and said horn for preventing vibrations from the bracket from being transmitted to said horn.

FRANK R. HOUSE.